(12) United States Patent
Joshi et al.

(10) Patent No.: US 11,777,373 B2
(45) Date of Patent: Oct. 3, 2023

(54) METHOD OF EFFICIENT THERMAL MANAGEMENT OF ROTOR IN A HIGH POWER GENERATOR

(71) Applicant: Hamilton Sundstrand Corporation, Charlotte, NC (US)

(72) Inventors: Ashutosh Joshi, Roscoe, IL (US); Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 200 days.

(21) Appl. No.: 17/223,354

(22) Filed: Apr. 6, 2021

(65) Prior Publication Data
US 2021/0320564 A1    Oct. 14, 2021

Related U.S. Application Data

(60) Provisional application No. 63/008,110, filed on Apr. 10, 2020.

(51) Int. Cl.
*H02K 9/19* (2006.01)
*H02K 1/24* (2006.01)
*H02K 3/18* (2006.01)
*H02K 15/02* (2006.01)
*H02K 15/06* (2006.01)

(52) U.S. Cl.
CPC ............... *H02K 9/19* (2013.01); *H02K 1/24* (2013.01); *H02K 3/18* (2013.01); *H02K 15/022* (2013.01); *H02K 15/062* (2013.01)

(58) Field of Classification Search
CPC .......... H02K 15/022; H02K 3/24; H02K 9/19; H02K 15/095; H02K 3/34; H02K 15/062; H02K 1/24; H02K 3/18; H02K 15/105
See application file for complete search history.

(56) References Cited

U.S. PATENT DOCUMENTS

| 3,075,104 A | 1/1963 | Willyoung et al. |
| 3,249,775 A | 5/1966 | Bayac |
| 4,282,450 A * | 8/1981 | Eckels ............... H02K 3/24 336/DIG. 1 |

(Continued)

FOREIGN PATENT DOCUMENTS

| DE | 102009044196 A1 | 4/2010 |
| GB | 1203251 A | 8/1970 |

(Continued)

OTHER PUBLICATIONS

European Search Report Issued in European Application No. 21163960.4-1201 dated Aug. 26, 2021; 9 Pages.

*Primary Examiner* — Leda T Pham
(74) *Attorney, Agent, or Firm* — Cantor Colburn LLP

(57) ABSTRACT

Disclosed is a rotor for a generator, having: a rotor body; rotor poles extending radially outward from the rotor body, wherein each rotor pole includes a pole body and opposing pole circumferential side surfaces that are spaced apart from each other in a circumferential direction about the rotor body; coil windings wound about the rotor poles to form a wire bundle against one of the pole circumferential side surfaces; and a wire separator, disposed within the wire bundle, that divides the coil windings within the wire bundle into subsets of wire bundles.

14 Claims, 4 Drawing Sheets

(56) References Cited

U.S. PATENT DOCUMENTS

| | | | | |
|---|---|---|---|---|
| 4,333,027 A | * | 6/1982 | Madsen | H02K 3/48 |
| | | | | 310/214 |
| 4,513,218 A | | 4/1985 | Hansen | |
| 8,390,156 B2 | * | 3/2013 | Laloy | H02K 3/527 |
| | | | | 310/59 |
| 2008/0284262 A1 | * | 11/2008 | Nelson | C08J 5/10 |
| | | | | 310/52 |
| 2013/0127289 A1 | | 5/2013 | Koga | |
| 2014/0217842 A1 | * | 8/2014 | Kikuchi | H02K 9/19 |
| | | | | 310/54 |
| 2019/0103786 A1 | | 4/2019 | Shaik et al. | |

FOREIGN PATENT DOCUMENTS

| | | | |
|---|---|---|---|
| GB | 1215493 A | 12/1970 | |
| JP | H11341724 A | 12/1999 | |

* cited by examiner

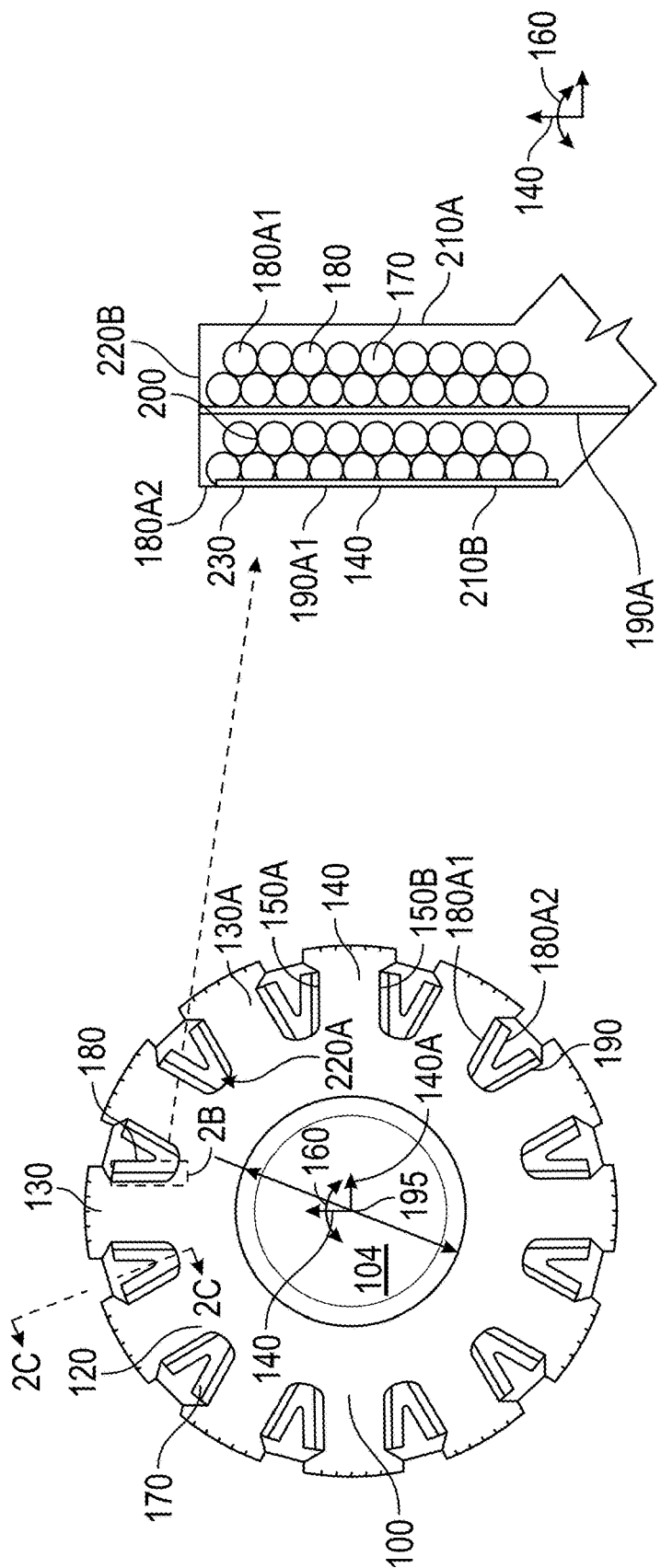
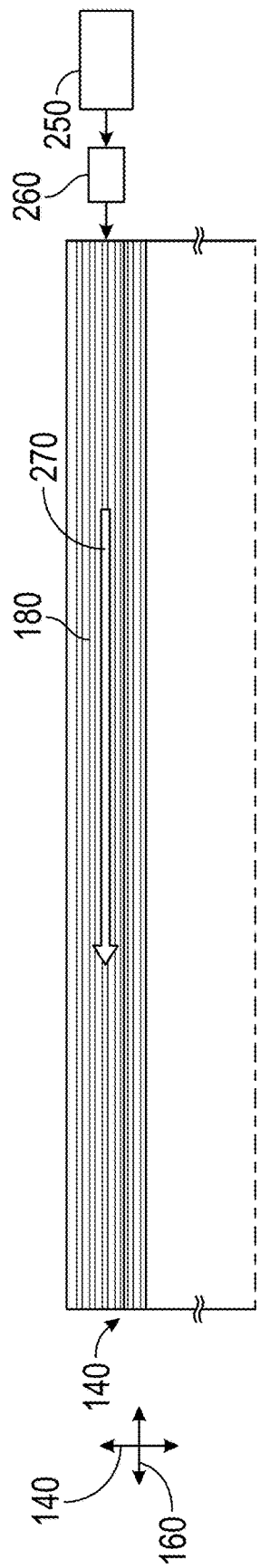
FIG. 2A
FIG. 2B
FIG. 2C

METHOD OF EFFICIENT THERMAL MANAGEMENT OF ROTOR IN A HIGH POWER GENERATOR

CROSS-REFERENCE TO RELATED APPLICATIONS

This application claims the benefit of U.S. Provisional Application 63/008,110 filed Apr. 10, 2020, the disclosure of which is incorporated herein by reference in its entirety.

BACKGROUND

Exemplary embodiments of the present disclosure pertain to rotors for generators and more specifically to a rotor with wire bundle separators and a method of efficient thermal management of a rotor in a high power generator.

One of the limitations to increasing the capacities of generators is the temperature of the rotor windings. For example, increasing the current supplied to the field winding on a generator rotor raises the capacity by increasing effective ampere-turns. However, this also increases the amount of heat generated due to losses in the windings. A flow of coolant may be directed to engage the rotor in order to hold the winding temperatures to reasonable levels for reliable operation of the machine.

BRIEF DESCRIPTION

Disclosed is a rotor for a generator, comprising: a rotor body; rotor poles extending radially outward from the rotor body, wherein each rotor pole includes a pole body and opposing pole circumferential side surfaces that are spaced apart from each other in a circumferential direction about the rotor body; coil windings wound about the rotor poles to form a wire bundle against one of the pole circumferential side surfaces; and a wire separator, disposed within the wire bundle, that divides the coil windings within the wire bundle into subsets of wire bundles.

In addition to one or more of the above disclosed features, or as an alternate, the wire separator, and adjacent coil windings of the wire bundle, define an edge cooling channel therebetween; and the coil windings of the wire bundle define an intra-bundle cooling channel therebetween, wherein the intra-bundle cooling channel is at a location spaced apart from inner and outer circumferential boundaries of the wire bundle and inner and outer radial boundaries of the wire bundle, and wherein the edge cooling channel is larger than the intra-bundle cooling channel.

In addition to one or more of the above disclosed features, or as an alternate, the wire separator is resistant to heat.

In addition to one or more of the above disclosed features, or as an alternate, the wire separator is a dielectric.

In addition to one or more of the above disclosed features, or as an alternate, the wire separator is formed of an aramid polymer.

In addition to one or more of the above disclosed features, or as an alternate, the wire separator comprises one or more of: a radial wire separator that extends in the radial outward direction between the inner and outer radial boundaries of the wire bundle; and a circumferential wire separator that extends in the circumferential direction between the inner and outer circumferential boundaries of the wire bundle.

In addition to one or more of the above disclosed features, or as an alternate, the wire separator comprises: a plurality of the circumferential wire separators that are spaced apart from each other in the radial outward direction within the wire bundle, whereby the wire separator forms at least three of the subsets of wire bundles.

In addition to one or more of the above disclosed features, or as an alternate, the wire separator further includes the radial wire separator, whereby the wire separator forms at least six of the subsets of wire bundles.

In addition to one or more of the above disclosed features, or as an alternate, the rotor further comprises: a coolant reservoir fluidly connected to the rotor by a pump whereby coolant flows in an axial direction between the rotor poles, and the coolant is configured to flow through the edge cooling channel and the intra-bundle cooling channel.

In addition to one or more of the above disclosed features, or as an alternate, the coolant is oil.

Further disclosed is a method of manufacturing a rotor for a generator, comprising: winding a wire bundle about rotor poles of a rotor, wherein: the rotor defines a rotor body and the rotor poles extend in a radial outward direction from the rotor body; and each rotor pole defines a pole body and pole circumferential side surfaces that are spaced apart from each other in a circumferential direction about the rotor body, and positioning a wire separator between coil windings while winding the wire bundle to divide the coil windings in the wire bundle into subsets of wire bundles.

In addition to one or more of the above disclosed features, or as an alternate, positioning a wire separator within the wire bundle includes: forming, between adjacent coil windings of the wire bundle and the wire separator, an edge cooling channel; and forming, between adjacent coil windings of the wire bundle, an intra-bundle cooling channel, wherein the intra-bundle cooling channel is at a location spaced apart from the wire separator, inner and outer circumferential boundaries of the wire bundle and inner and outer radial boundaries of the wire bundle, and wherein the edge cooling channel is larger than the intra-bundle cooling channel.

In addition to one or more of the above disclosed features, or as an alternate, positioning the wire separator between the coil windings includes thermally separating the subsets of wire bundles from each other with the wire separator.

In addition to one or more of the above disclosed features, or as an alternate, positioning the wire separator between the coil windings includes dielectrically separating the subsets of wire bundles from each other with the wire separator.

In addition to one or more of the above disclosed features, or as an alternate, positioning the wire separator between the coil windings includes positioning an aramid polymer separator between the wire bundles.

In addition to one or more of the above disclosed features, or as an alternate, positioning the wire separator between the coil windings includes positioning a radial wire separator within the wire bundle that extends in the radial outward direction between the inner and outer radial boundaries of the wire bundle; and positioning a circumferential wire separator within the wire bundle that extends in the circumferential direction between the inner and outer circumferential boundaries of the wire bundle.

In addition to one or more of the above disclosed features, or as an alternate, positioning the wire separator between the coil windings includes positioning a plurality of the circumferential wire separators that are spaced apart from each other in the radial outward direction within the wire bundle, whereby the wire separator forms at least three of the subsets of wire bundles.

In addition to one or more of the above disclosed features, or as an alternate, positioning the wire separator between the coil windings further includes positioning the radial wire separator within the wire bundle, whereby the wire separator forms at least six of the subsets of wire bundles.

In addition to one or more of the above disclosed features, or as an alternate, the method includes pumping, from a coolant reservoir, coolant to the rotor so that the coolant flows between the rotor poles, whereby the coolant flows through the edge cooling channel and the intra-bundle cooling channel.

In addition to one or more of the above disclosed features, or as an alternate, providing the coolant includes providing oil between the rotor poles, so that the oil flows through the edge cooling channel and the intra-bundle cooling channel.

BRIEF DESCRIPTION OF THE DRAWINGS

The following descriptions should not be considered limiting in any way. With reference to the accompanying drawings, like elements are numbered alike:

FIG. 2A is a cross-section of a rotor taken through the windings thereon and that illustrates a wire separator according to an embodiment;

FIG. 2B is a close-up of section 2B of FIG. 2A showing a wire separator within the coil windings;

FIG. 2C is a sectional view of taken along line 2C-2C of FIG. 2A;

DETAILED DESCRIPTION

A detailed description of one or more embodiments of the disclosed apparatus and method are presented herein by way of exemplification and not limitation with reference to the Figures.

In generators utilizing known rotor designs, coil windings (otherwise referred to as wire windings) may be subjected to a flow of cooling oil for the purposes of reducing the impact of generated heat. The oil flows through cooling channels formed between and around the coil windings. Coil winding configurations, however, may result in the formation of relatively small cooling channels between the wires, which may result in the formation of hot spots in the wires located around those cooling channels due to a small amount of oil flow. The formation of hot spots may cause the rotor windings to run hot and operate less reliably. If an output demand on the generator is increased, the rotors tend to run hotter, and reliability is reduced further. The thermal challenges could be realized in two pole or large pole rotors.

Figure 1:
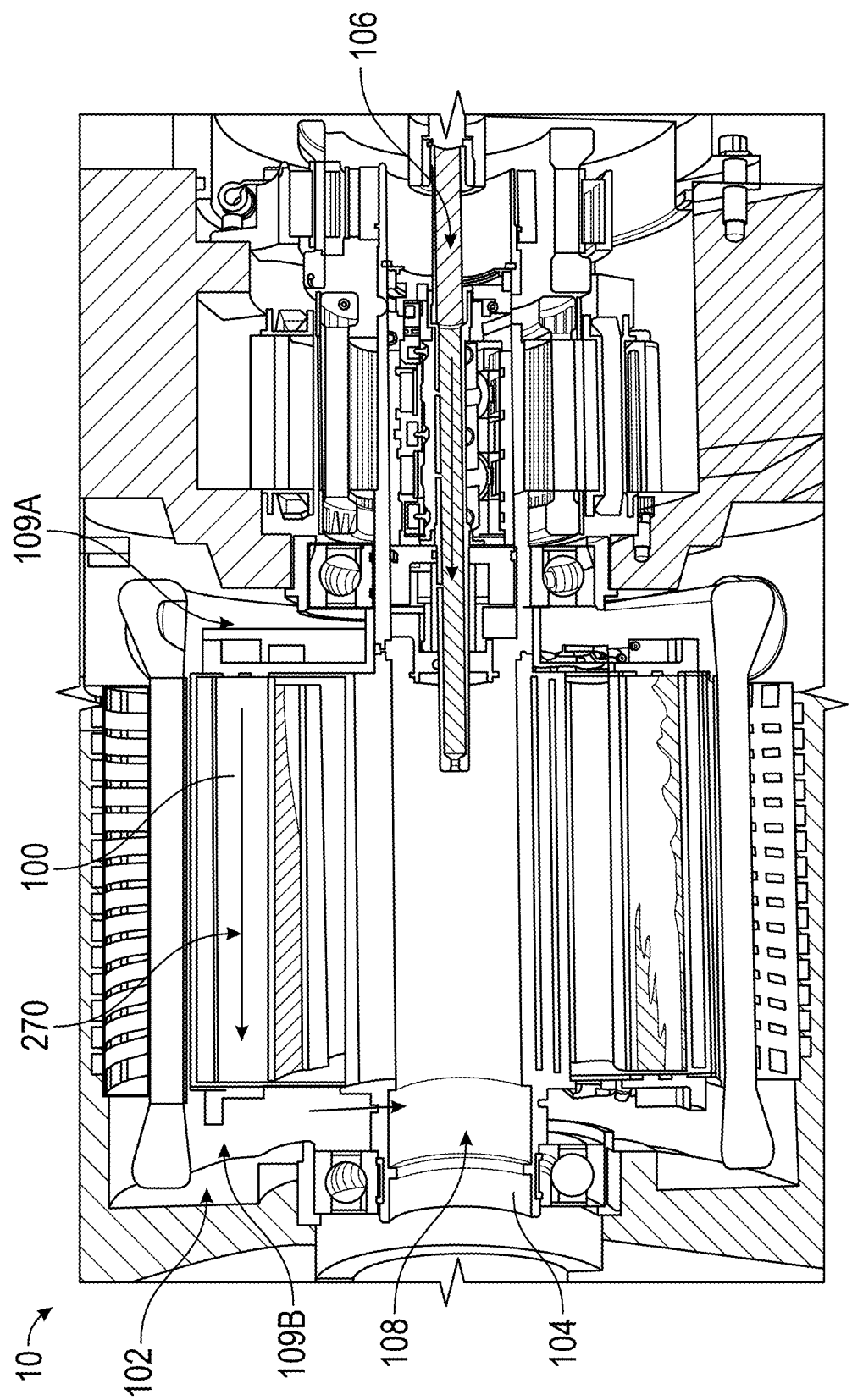
FIG. 1 shows a sectional view of a generator that may utilize features of the disclosed embodiments.

FIG. 1 shows a sectional view of a generator 10 including a rotor 100 surrounded by a stator 102. A center shaft 104 of the generator 10 includes an oil inlet 106 and an oil outlet 108. End plates 109A, 109B axially surround the rotor 100 to provide for a path for coolant (oil) 270 (see also FIG. 2C) between rotor poles 130 (which may also be referred to as a rotor pole)(see also FIG. 2A) to cool coil windings 170 (FIG. 2A).

FIG. 2A shows additional features of the rotor 100 for the generator 10. The rotor 100 includes a rotor body 120 disposed about the center shaft 104. Rotor poles 130 extend in a radial outward direction 140, e.g., radially outward from the radial center 195 of the rotor body 120. (It is to be appreciated that the radial outward direction 140 is not limited to the single arrow labeled 140 in FIG. 2A, but includes, e.g., direction 140A as just one additional example.) Each rotor pole 130A includes a pole body 140 and pole circumferential side surfaces 150A, 150B that are spaced apart from each other in a circumferential direction 160 about the pole body 140 (or rotor body 120).

Coil windings 170 wound about the rotor poles 130 form a wire bundle 180 against one of the pole circumferential side surfaces 150A, 150B. A wire separator 190, disposed within the wire bundle 180, divides the coil windings 170 within the wire bundle 180 into subsets of wire bundles e.g., 180A1, 180A2. As illustrated in FIGS. 2A, 2B and 2C, the wire separator 190 is otherwise referred to as a radial wire separator 190A in that extends radially outward relative to the radial center 195 of the rotor 100. That is the radial wire separator 190A extends in the radial outward direction 140 between the inner and outer radial boundaries 220A, 220B of the wire bundle 180. With the radial wire separator 190A, the wire bundle 180 forms at least two subsets of wire bundles 180A1, 180A2 (FIG. 2B). Liners may also be disposed between the windings and the rotor core, e.g., as shown with liner 190A1, formed of the same material as the wire separator 190A. The liner 190A1 is used between the rotor core/pole 130 and wire bundles 180 to insulate the wires from rotor core. Inter-wire bundle liner (e.g., the wire separator 190A) is used to separate the wire bundles 180 so that cooling flow is uniform in each wire bundle 180 to avoid build-up of hot spots.

In one embedment the wire separator 190, and adjacent coil windings 170 of the wire bundle 180, define an edge cooling channel 200 therebetween. The coil windings 170 of the wire bundle 180 define an intra-bundle cooling channel 230 therebetween. The intra-bundle cooling channel 230 is at a location spaced apart from inner and outer circumferential boundaries 210A, 210B of the wire bundle 180 and inner and outer radial boundaries 220A, 220B of the wire bundle 180. The edge cooling channel 200 is larger than the intra-bundle cooling channel 230. The radial inner boundary 220A is illustrated schematically and represents a bottom vertex of the wire bundle 180 between adjacent rotor poles 130. It is to be appreciated the coil windings 170 of the wire bundle 180 extend along the full bottom vertex of the rotor 100 between adjacent rotor poles 130 (e.g., FIG. 2A) even though FIGS. 2B, 3A and 3B show fewer than this amount of coil windings 170 for purposes of simplicity.

In one embodiment, the wire separator 190 is resistant to heat. In one embodiment, the wire separator 190 is formed of a dielectric material. In one embodiment, the wire separator 190 is formed of an aramid polymer, such as NOMEX, trademarked by DuPont or Kapton film also by DuPont.

Figure 3B:
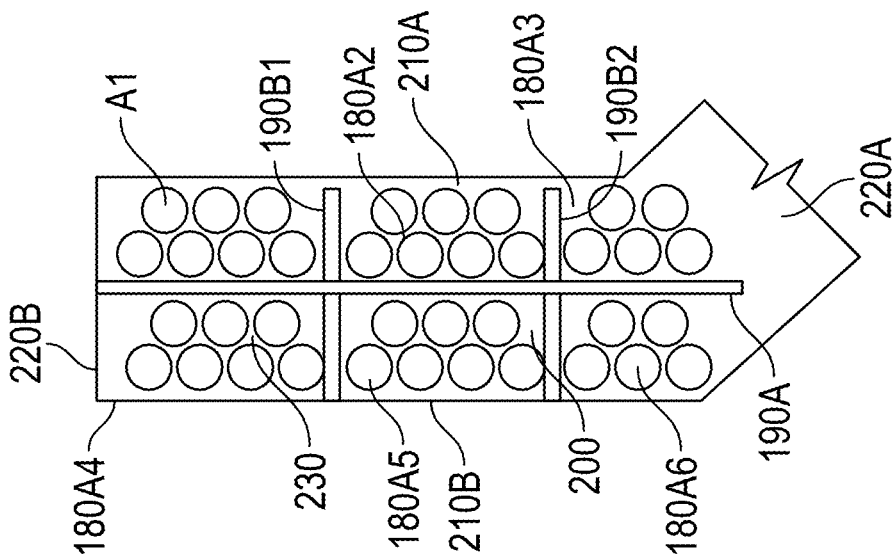
FIG. 3B is an alternative embodiment of the separator configuration showing a plurality of circumferential wire separators and a radial wire separator.
Figure 3A:
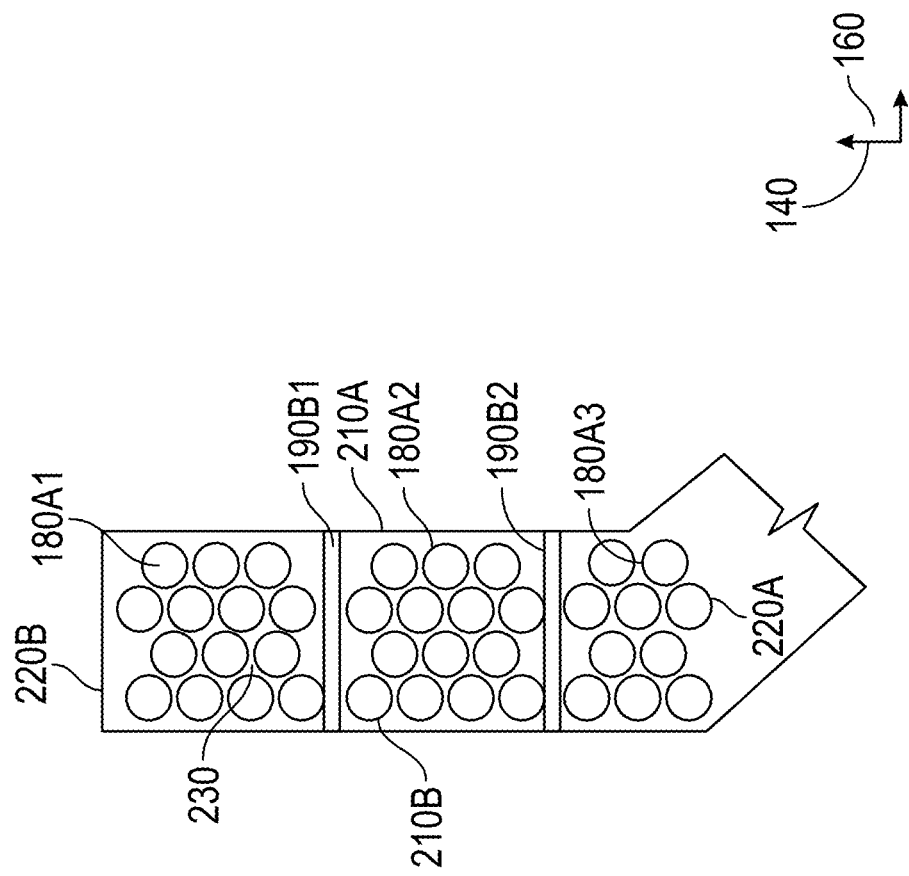
FIG. 3A is an alternative embodiment of the separator configuration showing a plurality of circumferential wire separators within the coil windings.
Figure 4:
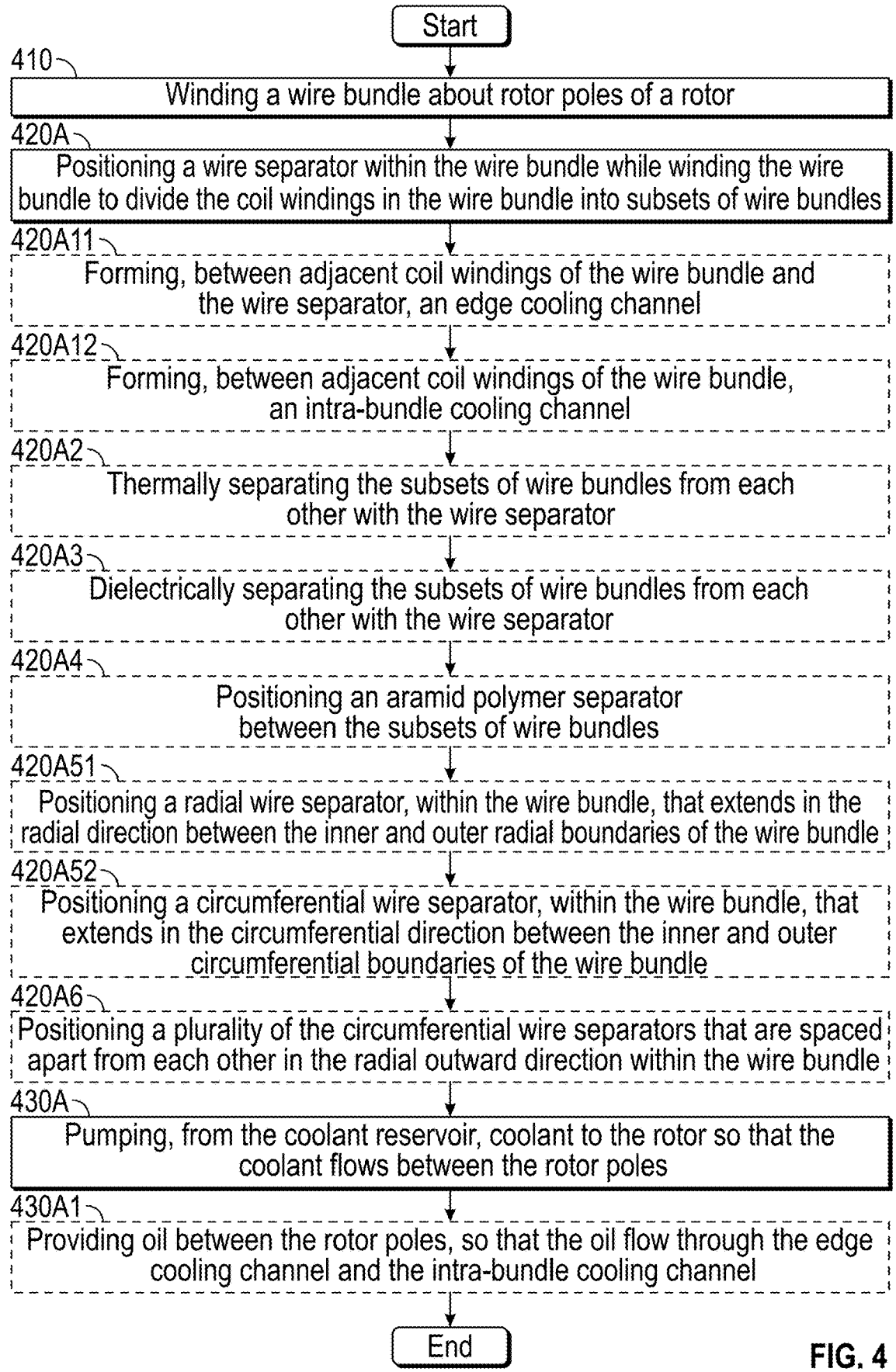
FIG. 4 is a flowchart showing a method of configuring the rotor of FIG. 2A.

The wire separator 190 may additionally or alternatively include a circumferential wire separator 190B (FIGS. 3A and 3B). The circumferential wire separator 190B extends in the circumferential direction 160 between the inner and outer circumferential boundaries 210A, 210B of the wire bundle 180.

In one embodiment, the wire separator 190 may include a plurality of the circumferential wire separators 190B1, 190B2 (FIG. 3A) that are spaced apart from each other in the radial outward direction 140 within the wire bundle 180. From this configuration, the wire separator 190 forms at least three of the subsets of wire bundles 180A1-1803 (FIG. 3A).

In one embodiment, the wire separator 190 further includes the radial wire separator 190A along with the plurality of circumferential wire separators 190B1, 190B2 (FIG. 3B). From this configuration the wire separator 190 forms at least six of the subsets of wire bundles 180A1-180A6.

FIG. 2C shows, for simplicity, a coolant reservoir 250 fluidly connected to the rotor 100 by a pump 260. A generator 10 may have a pump 260 utilized to pump oil from the reservoir 250 to the generator 10. Once this oil is delivered to the generator shaft 104 (FIG. 1), rotational force of generator shaft 104 pumps the oil through orifices through end plates 109A, 109B to the rotor windings 180. Once reaching rotor winding 180, oil flow is split between the poles 130. After cooling the rotor 100, the oil is scavenged from a generator cavity, pumped to a heat exchanger, cooled and sent to the reservoir 250.

From this configuration, coolant 270 flows in an axial direction 280 between the rotor poles 130, to thereby flood the rotor with coolant. Thus, the coolant 270 is configured to flow axially along the rotor poles 130 (FIGS. 1 and 2A) through the edge cooling channel 200 and the intra-bundle cooling channel 230 of the bundle 180. In one embodiment the coolant 270 is oil.

Further disclosed is a method of manufacturing the rotor 100 for the generator 10. As shown in block 410, the method includes winding the wire bundle 180 about the rotor poles 130 of the rotor 100. As indicated above the rotor 100 defines the rotor body 120 and the rotor poles 130 extend in the radial outward direction 140 from the rotor body 120. In addition, each rotor pole 130A defines the pole body 140 and pole circumferential side surfaces 150A, 150B that are spaced apart from each other in the circumferential direction 160 about the pole body 140.

As shown in block 420A, the method includes positioning the wire separator 190 within the wire bundle 180 (i.e., between the coil windings) while winding the wire bundle 180, to divide the coil windings 170 in the wire bundle 180 into subsets of wire bundles 180A1, 180A2.

As shown in block 420A11, positioning the wire separator 190 within the wire bundle 180 includes forming, between adjacent coil windings 170 of the wire bundle 180 and the wire separator 190, an edge cooling channel 200. As shown in block 420A12, this also includes forming, between adjacent coil windings 170 of the wire bundle 180, an intra-bundle cooling channel 230. The intra-bundle cooling channel 230 is at a location spaced apart from the wire separator 190, inner and outer circumferential boundaries 210A, 210B of the wire bundle 180, and inner and outer radial boundaries 220A, 220B, of the wire bundle 180. As indicated, the edge cooling channel 200 is larger than the intra-bundle cooling channel 230.

As shown in block 420A2, positioning the wire separator 190 within the wire bundle 180 includes thermally separating the subsets of wire bundles 180A from each other with the wire separator 190. As shown in block 420A3, positioning the wire separator 190 within the wire bundle 180 includes dielectrically separating the subsets of wire bundles 180A from each other with the wire separator 190. As shown in block 420A4, positioning the wire separator 190 between the wire bundles 180 includes positioning an aramid polymer separator between the subsets of wire bundles 180A.

As shown in block 420A51, positioning the wire separator 190 within the wire bundle includes positioning a radial wire separator 190A within the wire bundle that extends in the radial outward direction 140 between the inner and outer radial boundaries 220A, 220B of the wire bundle 180. From this configuration the wire separator 190 forms at least two of the subsets of wire bundles 180A1-180A2. As also shown in block 420A52, this may also or alternatively include positioning a circumferential wire separator 190B within the wire bundle 180 that extends in the circumferential direction 160 between the inner and outer circumferential boundaries 210A, 210B of the wire bundle 180.

As shown in block 420A6, positioning the wire separator 190 within the wire bundle 180 may include positioning a plurality of the circumferential wire separators 190B1, 190B2 within the wire bundle. The plurality of the circumferential wire separators 190B1, 190B2 are spaced apart from each other in the radial outward direction 140, to be laid substantially in parallel with each other. From this configuration the wire separator 190 forms at least three of the subsets of wire bundles 180A1-180A3. As indicated combining the plurality of circumferential wire separators 190B1, 190B2 with the radial wire separator 190A, such that they cross each other, e.g., vertically and horizontally, forms at least six of the subsets of wire bundles 180A1-180A6.

As shown in block 330, the method includes pumping, from the coolant reservoir 250, coolant 270 to the rotor 100 so that the coolant 270 flows between the rotor poles 130. From this configuration the coolant 270 flows through the edge cooling channel 200 and the intra-bundle cooling channel 230.

As shown in block 330A1, providing the coolant 270 includes providing oil between the rotor poles 130, so that the oil flows through the edge cooling channel 200 and the intra-bundle cooling channel 230.

In accordance with the above disclosed embodiments, in an oil flooded rotor, wire bundles are divided into multiple groups or subsets, which may have different configuration layouts, with the utilization of separators (otherwise referred to as wire separators and/or separator liners), which may be Nomex or Kapton separators. The disclosed embodiments may reduce temperature gradients across the wire bundle. The wire separators may be provided by using multiple separators laid in parallel or crossing (vertical and/or horizontal) orientations to form subsets or groups of wire bundles. This configuration may define relatively large fluid channels at the boundary edges of each of the subsets of wire bundles, e.g., between each of the subsets of the wire bundles and at an adjacent surface portion of the wire separators. This may enable the subsets of wire bundles to operate in isothermal temperatures environments, e.g., due to an efficient heat transfer from the wires to the fluid channels.

The embodiments may provide a larger flow area near the middle section of rotor bundle. Benefits of the disclosed embodiments may include efficient cooling from reduced temperatures on rotor windings, a greater amount of power generated from the generator due to reduced temperatures, and an improved reliability of the generator from the reduced temperatures. The benefits of the embodiments may be realized without a significant increase in space. As indicated, the separators may be relatively easily wrapped around the coil wires to form the larger cooling channels. The wire separators may create larger channels at the edge boundaries of the coil windings, thereby improving the cooling of a cross-section of the wire bundles. In addition, the different configurations of the separators may enable the groups of wires to be isothermally cooled and avoid build of hot spots in rotor windings.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor for a generator, comprising:
   a rotor body;
   rotor poles extending radially outward from the rotor body, wherein each rotor pole includes a pole body and opposing pole circumferential side surfaces that are spaced apart from each other in a circumferential direction about the rotor body;
   coil windings wound about the rotor poles to form a wire bundle against one of the pole circumferential side surfaces; and
   a wire separator, disposed within the wire bundle, that divides the coil windings within the wire bundle into subsets of wire bundles;
   wherein:
      the wire separator, and adjacent coil windings of the wire bundle, define an edge cooling channel therebetween; and
      the coil windings of the wire bundle define an intra-bundle cooling channel therebetween,
      wherein the intra-bundle cooling channel is at a location spaced apart from inner and outer circumferential boundaries of the wire bundle and inner and outer radial boundaries of the wire bundle, and
      wherein the edge cooling channel is larger than the intra-bundle cooling channel,
      wherein the wire separator comprises:
         a radial wire separator that extends in a radial outward direction between the inner and outer radial boundaries of the wire bundle; and
         a plurality of circumferential wire separators that extend in the circumferential direction between the inner and outer circumferential boundaries of the wire bundle, and are spaced apart from each other in the radial outward direction within the wire bundle,
         whereby the wire separator forms at least three of the subsets of wire bundles.

2. The rotor of claim 1, wherein
   the wire separator is resistant to heat.

3. The rotor of claim 1, wherein
   the wire separator is a dielectric.

4. The rotor of claim 1, wherein
   the wire separator is formed of an aramid polymer.

5. The rotor of claim 1, wherein
   the wire separator further includes
   the radial wire separator,
   whereby the wire separator forms at least six of the subsets of wire bundles.

6. The rotor of claim 1, further comprising
   a coolant reservoir fluidly connected to the rotor by a pump whereby coolant flows in an axial direction between the rotor poles, and the coolant is configured to flow through the edge cooling channel and the intra-bundle cooling channel.

7. The rotor of claim 6, wherein
   the coolant is oil.

8. A method of manufacturing a rotor for a generator, comprising:
   winding a wire bundle about rotor poles of a rotor,
   wherein:
      the rotor defines a rotor body and the rotor poles extend in a radial outward direction from the rotor body; and
      each rotor pole defines a pole body and pole circumferential side surfaces that are spaced apart from each other in a circumferential direction about the rotor body, and
   positioning a wire separator between coil windings while winding the wire bundle to divide the coil windings in the wire bundle into subsets of wire bundles;
   wherein: positioning a wire separator within the wire bundle includes:
      forming, between adjacent coil windings of the wire bundle and the wire separator, an edge cooling channel; and
      forming, between adjacent coil windings of the wire bundle, an intra-bundle cooling channel,
      wherein the intra-bundle cooling channel is at a location spaced apart from the wire separator, inner and outer circumferential boundaries of the wire bundle and inner and outer radial boundaries of the wire bundle, and
      wherein the edge cooling channel is larger than the intra-bundle cooling channel;
   wherein: positioning the wire separator between the coil windings includes
      positioning a radial wire separator within the wire bundle that extends in the radial outward direction between the inner and outer radial boundaries of the wire bundle; and
      positioning a plurality of circumferential wire separator within the wire bundle that extend in the circumferential direction between the inner and outer circumferential boundaries of the wire bundle and are spaced apart from each other in the radial outward direction within the wire bundle,
      whereby the wire separator forms at least three of the subsets of wire bundles.

9. The method of claim 8, wherein:
   positioning the wire separator between the coil windings includes
   thermally separating the subsets of wire bundles from each other with the wire separator.

10. The method of claim 8, wherein:
    positioning the wire separator between the coil windings includes
    dielectrically separating the subsets of wire bundles from each other with the wire separator.

11. The method of claim 8, wherein:
positioning the wire separator between the coil windings includes
positioning an aramid polymer separator between the wire bundles.

12. The method of claim 8, wherein:
positioning the wire separator between the coil windings further includes
positioning the radial wire separator within the wire bundle,
whereby the wire separator forms at least six of the subsets of wire bundles.

13. The method of claim 8, including:
pumping, from a coolant reservoir, coolant to the rotor so that the coolant flows between the rotor poles, whereby the coolant flows through the edge cooling channel and the intra-bundle cooling channel.

14. The method of claim 13, wherein:
providing the coolant includes
providing oil between the rotor poles, so that the oil flows through the edge cooling channel and the intra-bundle cooling channel.

\* \* \* \* \*